2 Sheets—Sheet 1.

P. STARR.
Feeders for Hat-Forming Machines.

No. 208,545. Patented Oct. 1, 1878.

Attest:
Ellsworth A. Smith
Orby Amsbury

Inventor:
Peter Starr

N. PETERS, PHOTO-LITHOGRAPHER, WASHINGTON, D C.

2 Sheets—Sheet 2.
P. STARR.
Feeders for Hat-Forming Machines.
No. 208,545. Patented Oct. 1, 1878.
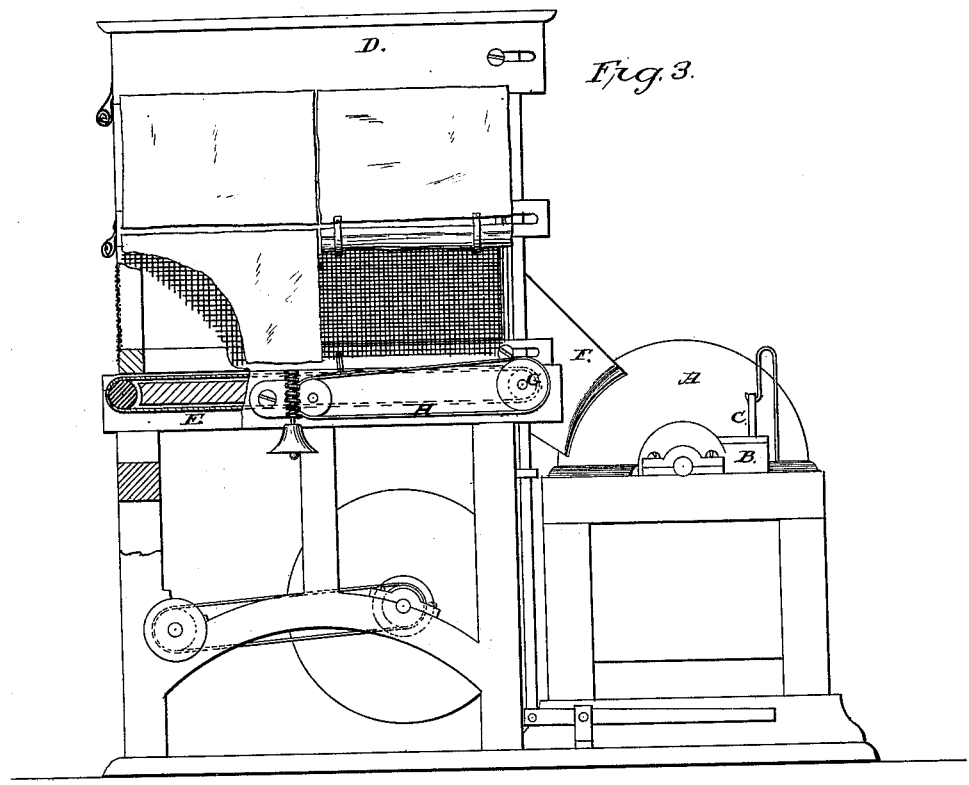
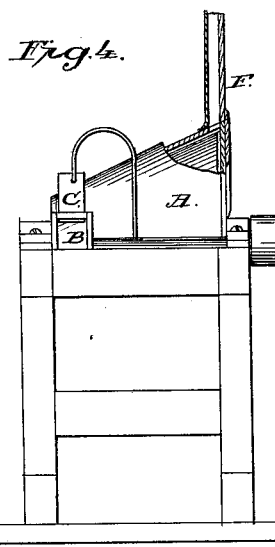
Attest:
Ellsworth A. Smith
Patsy Amsburg
Inventor:
Peter Starr

UNITED STATES PATENT OFFICE.

PETER STARR, OF DANBURY, CONNECTICUT.

IMPROVEMENT IN FEEDERS FOR HAT-FORMING MACHINES.

Specification forming part of Letters Patent No. 208,545, dated October 1, 1878; application filed January 12, 1878.

*To all whom it may concern:*

Be it known that I, PETER STARR, of Danbury, in the county of Fairfield and State of Connecticut, have invented a new and useful Improvement in Hat-Forming-Machine Feeders, which improvement is fully set forth in the following specification and accompanying drawings, in which—

Figure 1:
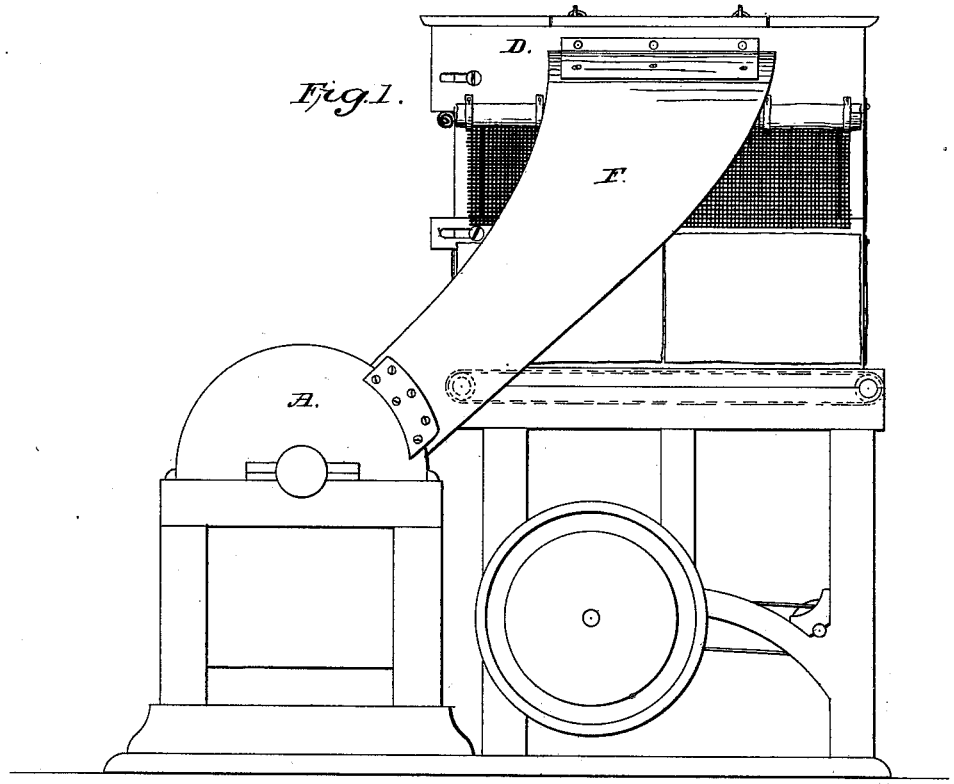
Figure 2:
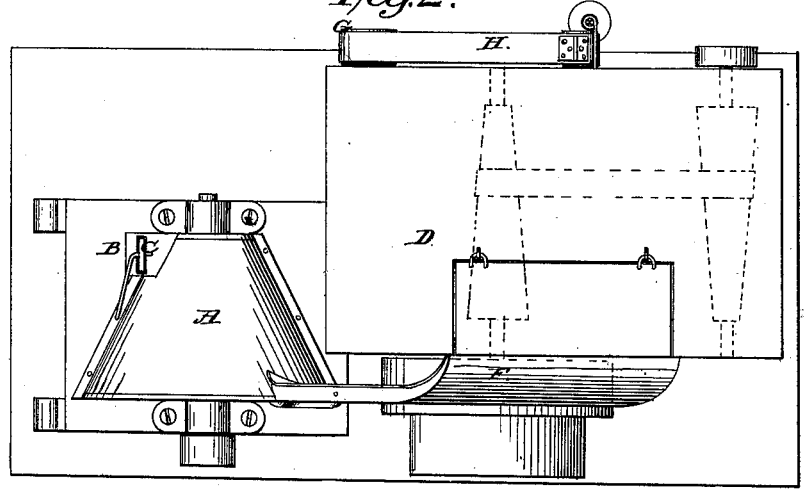

Figure 1 is a side elevation; Fig. 2, a plan; Fig. 3, a side elevation with part broken away. Fig. 4 is an end elevation of the blower and picker, showing the gate.

The object of my invention is to furnish a device for feeding fur into a hat-forming machine, so that the fur may be received into the forming-machine in a uniform and rapid manner, and in such a condition that the fur will be thoroughly separated, thus preventing any liability of the fur passing through the forming-machine in a lumpy condition, as is the case in the old manner.

In the drawing, A is a picker and blower for receiving the fur in a matted condition at entrance B, at which entrance is gate C, to control at will the amount of air to be allowed to enter the conductor through the blower, also to cut off the supply wholly and instantly as soon as the fur is sufficiently picked and separated to enter the forming-machine.

D is a chamber for the reception of the fur which is blown from blower and picker A, which chamber is constructed with the ends adjustable, to admit of the lengthening or shortening the capacity of the chamber for the purpose of giving more or less settling-surface on apron E, as is necessary in providing for the formation of hats of different weight or size needed to be blown into the forming-machine for each hat.

F is a hollow tube or conductor, connecting picker A with chamber D, for the purpose of having the fur enter at the top of chamber D, thereby insuring a thorough and even distribution of the fur before passing into the forming-machine. The outlet of tube F at the entrance of chamber D is arranged with an adjustable clapper or trap, to enable the operator to control the direction of the fur as it enters the chamber.

Chamber D is constructed of a frame-work of convenient size and shape to conform to requirements in supplying a forming-machine, with the sides and ends covered with wire-work or any other substance of open-work, whereby a sufficient allowance of air-current coming from blower A may be gained to cause the fur to settle readily. These sides and ends are also arranged with sliding panels, or with aprons, to be closed or to remain open, as the amount of air-current is needed in the chamber.

E is an apron running inside, and furnished with power from shaft and pulley G, and at the bottom of chamber D to receive the fur that is blown therein, which is then drawn along and into the forming-machine as needed.

H is a belt, with a spur or pin permanently fastened thereon, to operate and cause a bell to strike as a signal that the apron is ready to carry the fur to the forming-machine.

Having thus described my invention, what I claim as new, and desire to secure by Letters Patent, is—

1. Gate C, in connection with conductor F, substantially as shown and described.

2. The adjustable chamber D, provided with open-work sides, substantially as shown and described, and for the purposes set forth.

PETER STARR.

Witnesses:
ELLSWORTH A. SMITH,
JABEZ AMSBURY.